United States Patent
Rath et al.

(10) Patent No.: US 12,015,176 B2
(45) Date of Patent: Jun. 18, 2024

(54) BATTERY MODULE INCLUDING A HOUSING WITH INTEGRATED BUS BAR

(71) Applicant: SAMSUNG SDI CO., LTD., Yongin-si (KR)

(72) Inventors: Helmut Rath, Suedstmk. (AT); Matthias Pucher, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 554 days.

(21) Appl. No.: 16/771,270

(22) PCT Filed: Nov. 14, 2018

(86) PCT No.: PCT/KR2018/013907
§ 371 (c)(1),
(2) Date: Jun. 10, 2020

(87) PCT Pub. No.: WO2019/146892
PCT Pub. Date: Aug. 1, 2019

(65) Prior Publication Data
US 2020/0381694 A1   Dec. 3, 2020

(30) Foreign Application Priority Data
Jan. 24, 2018   (EP) ..................................... 18153238

(51) Int. Cl.
*H01M 10/613*   (2014.01)
*H01M 50/503*   (2021.01)
(Continued)

(52) U.S. Cl.
CPC ....... *H01M 50/529* (2021.01); *H01M 10/613* (2015.04); *H01M 50/503* (2021.01);
(Continued)

(58) Field of Classification Search
CPC .... H01M 4/02; H01M 50/529; H01M 10/613; H01M 50/503; H01M 50/505;
(Continued)

(56) References Cited

U.S. PATENT DOCUMENTS 9,647,251 B2   5/2017   Prinz et al.
2001/0049055 A1   12/2001   Saito
(Continued)

FOREIGN PATENT DOCUMENTS

CN   102163702 A   8/2011
CN   102714337 A   10/2012
(Continued)

OTHER PUBLICATIONS

Chinese Office action dated Mar. 16, 2022 and accompanying Search Report dated Mar. 8, 2022 for corresponding CN 201880087520.7.
(Continued)

*Primary Examiner* — Lisa S Park
(74) *Attorney, Agent, or Firm* — Lee IP Law, P.C.

(57) ABSTRACT

The present invention refers to a battery module comprising a plurality of battery cells, each battery cell including a first terminal and a second terminal spaced apart and electrically isolated from one another, a housing including an upper housing part and a lower housing part assembled together to completely surround the plurality of battery cells, and a plurality of bus bars integrated in the upper housing part, wherein each of the plurality of bus bars is connected to one of the first and second terminals of at least two battery cells. The present invention further refers to a method of manufacturing the battery module, which is fast and easy and has a high tolerance for fluctuations in the battery cells height.

16 Claims, 6 Drawing Sheets

(51) Int. Cl.

| | |
|---|---|
| *H01M 50/505* | (2021.01) |
| *H01M 50/516* | (2021.01) |
| *H01M 50/522* | (2021.01) |
| *H01M 50/529* | (2021.01) |
| *H01M 50/55* | (2021.01) |
| *H01M 50/553* | (2021.01) |
| *H01M 50/566* | (2021.01) |
| *H01M 50/567* | (2021.01) |
| *H01R 11/28* | (2006.01) |
| *H01M 50/209* | (2021.01) |
| *H01M 50/227* | (2021.01) |

(52) U.S. Cl.
CPC ....... *H01M 50/505* (2021.01); *H01M 50/516* (2021.01); *H01M 50/522* (2021.01); *H01R 11/288* (2013.01); *H01M 50/209* (2021.01); *H01M 50/227* (2021.01); *H01M 50/55* (2021.01); *H01M 50/553* (2021.01); *H01M 50/566* (2021.01); *H01M 50/567* (2021.01)

(58) Field of Classification Search
CPC ............. H01M 50/516; H01M 50/522; H01M 50/209; H01M 50/227; H01M 50/55; H01M 50/553; H01M 50/566; H01M 50/567; H01M 10/625; H01M 10/647; H01M 10/653; H01M 10/6551; H01M 10/6554; H01M 2220/20; H01M 50/20; H01M 10/6556; H01M 50/502; H01M 50/543; H01R 11/288; Y02E 60/10
See application file for complete search history.

(56) References Cited

U.S. PATENT DOCUMENTS

| | | | |
|---|---|---|---|
| 2006/0166087 A1 | 7/2006 | Ogata et al. | |
| 2009/0181288 A1 | 7/2009 | Sato | |
| 2010/0316901 A1 | 12/2010 | Matsushima et al. | |
| 2011/0206948 A1 | 8/2011 | Asai et al. | |
| 2011/0293998 A1 | 12/2011 | Sato et al. | |
| 2012/0094155 A1 | 4/2012 | Lim | |
| 2012/0100399 A1 | 4/2012 | Adachi et al. | |
| 2012/0171532 A1 | 7/2012 | Lee et al. | |
| 2012/0282516 A1 | 11/2012 | Kim | |
| 2013/0065108 A1 | 3/2013 | Callicoat et al. | |
| 2013/0252048 A1 | 9/2013 | Teramoto et al. | |
| 2014/0113179 A1 | 4/2014 | Matthias | |
| 2014/0356668 A1 | 12/2014 | Kim | |
| 2015/0287964 A1 | 10/2015 | Park et al. | |
| 2015/0295214 A1* | 10/2015 | Cho | H01M 50/507 429/151 |
| 2015/0311570 A1 | 10/2015 | Adachi et al. | |
| 2016/0049703 A1* | 2/2016 | Lobert | H01M 10/486 429/62 |
| 2016/0064722 A1 | 3/2016 | Mack et al. | |
| 2016/0141571 A1 | 5/2016 | Adachi et al. | |
| 2016/0336547 A1* | 11/2016 | Dawson | H01M 10/0422 |
| 2018/0159096 A1 | 6/2018 | Kim et al. | |
| 2018/0331345 A1* | 11/2018 | Lim | H01M 50/503 |
| 2020/0035979 A1* | 1/2020 | Yamamoto | H01G 9/26 |

FOREIGN PATENT DOCUMENTS

| | | |
|---|---|---|
| CN | 202651312 U | 1/2013 |
| CN | 203398192 U | 1/2014 |
| CN | 103779518 A | 5/2014 |
| DE | 102010012999 A1 | 9/2011 |
| DE | 102012219386 A1 | 4/2014 |
| EP | 1705731 A1 | 9/2006 |
| EP | 2362463 A2 | 8/2011 |
| EP | 2521204 A1 | 11/2012 |
| JP | 2009-164085 A | 7/2009 |
| JP | 2010-211950 A | 9/2010 |
| JP | 2010-211950 | * 10/2010 |
| JP | 2010-287386 A | 12/2010 |
| JP | 2011-034883 A | 2/2011 |
| JP | 2011-253641 A | 12/2011 |
| JP | 2015-011849 A | 1/2015 |
| JP | 2015-53276 A | 3/2015 |
| JP | 2015-065055 A | 4/2015 |
| KR | 10-2011-0097666 A | 8/2011 |
| KR | 10-2012-0123946 A | 11/2012 |
| KR | 10-1711994 B1 | 3/2017 |
| KR | 10-2017-0054878 A | 5/2017 |
| KR | 10-2017-0106897 A | 9/2017 |

OTHER PUBLICATIONS

European Office action dated Apr. 6, 2022 for corresponding EP 18153238.3.
International Search Report dated Feb. 13, 2019 for PCT/KR2018/013907.
Extended European Search Report dated May 22, 2018 for corresponding EP18153238.
European Examination Report dated Aug. 6, 2019 for corresponding EP18153238.
European Office Action dated Jul. 23, 2020, of the corresponding European Patent Application No. 18153238.3.
Chinese Notice of Allowance dated Aug. 29, 2022 and Search Report dated Aug. 18, 2022 for corresponding CN 201880087520.7.
Korean Office Action dated Jun. 22, 2023, of the corresponding Korean Patent Application No. 10-2020-7020572.

* cited by examiner

[Fig. 1]
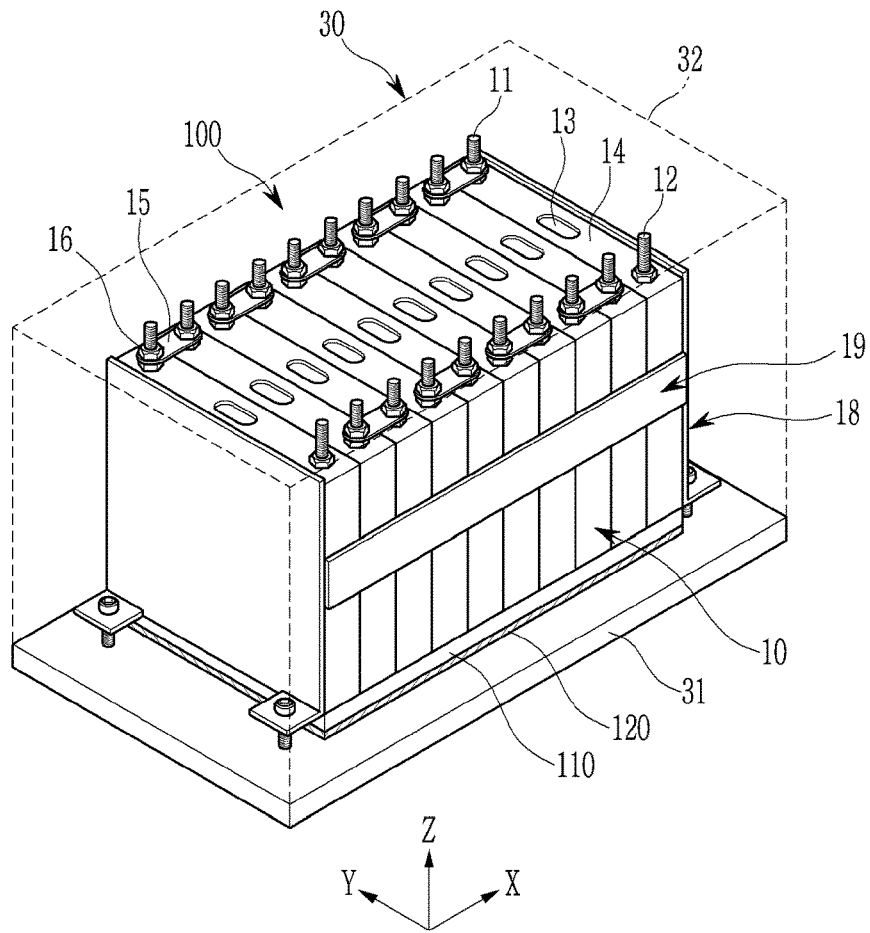
[Fig. 2]
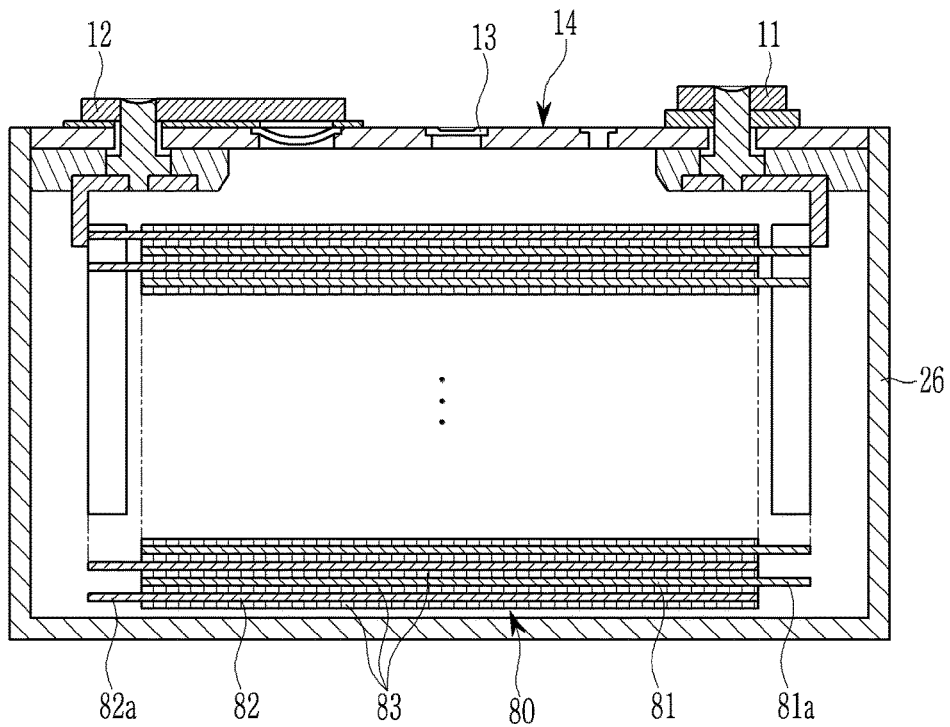

[Fig. 3]
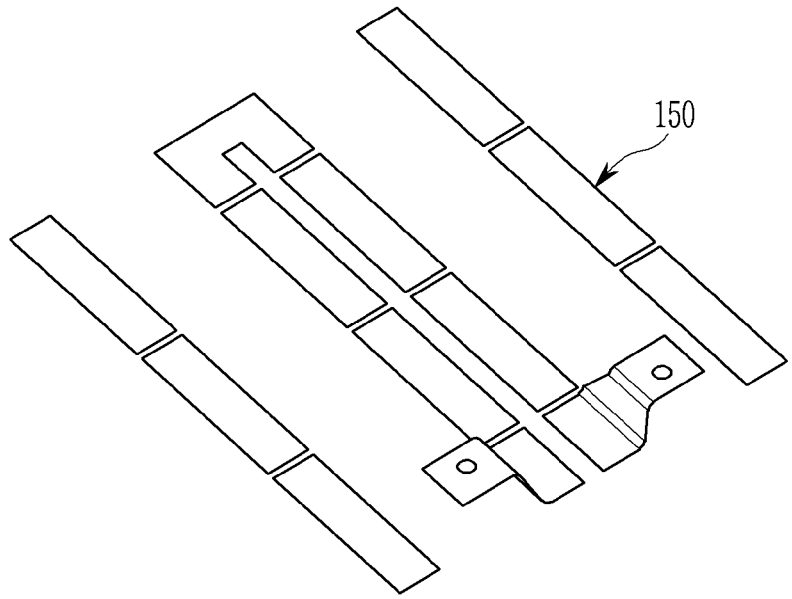
[Fig. 4]
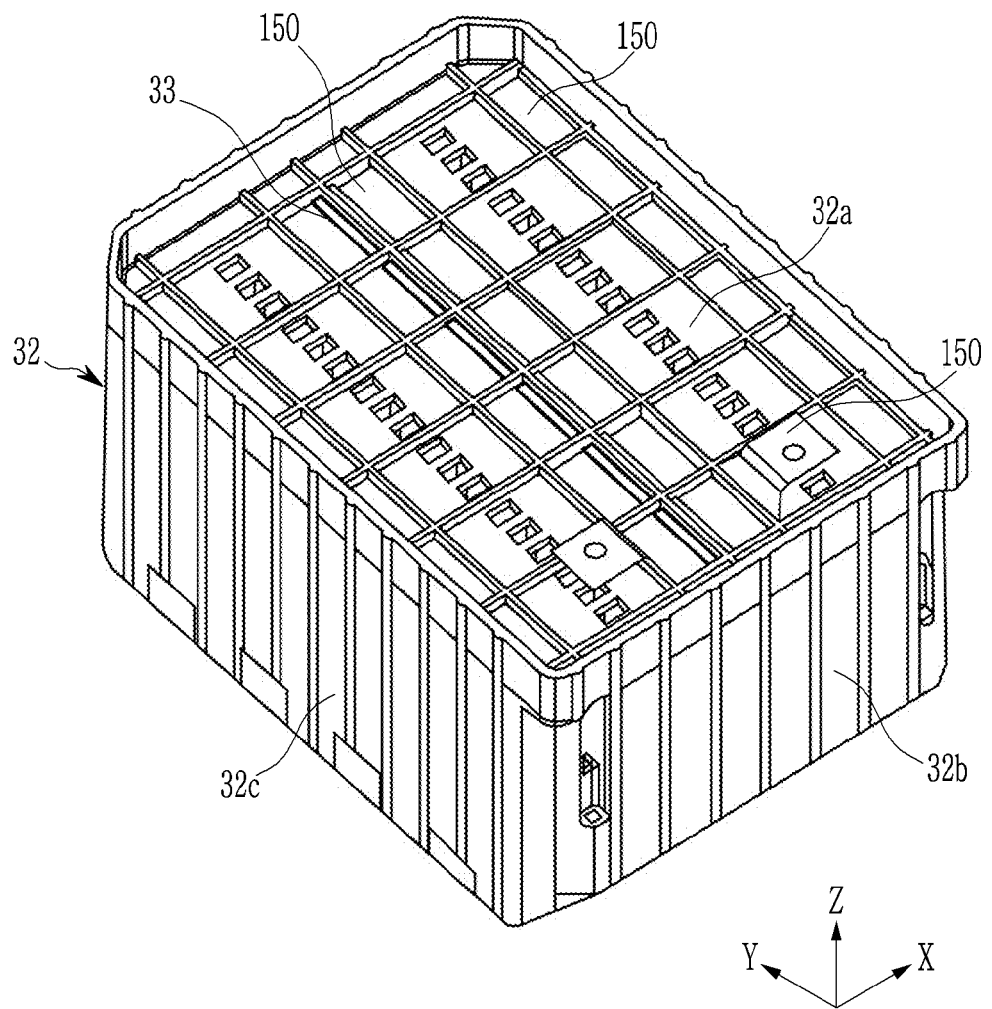

[Fig. 5]
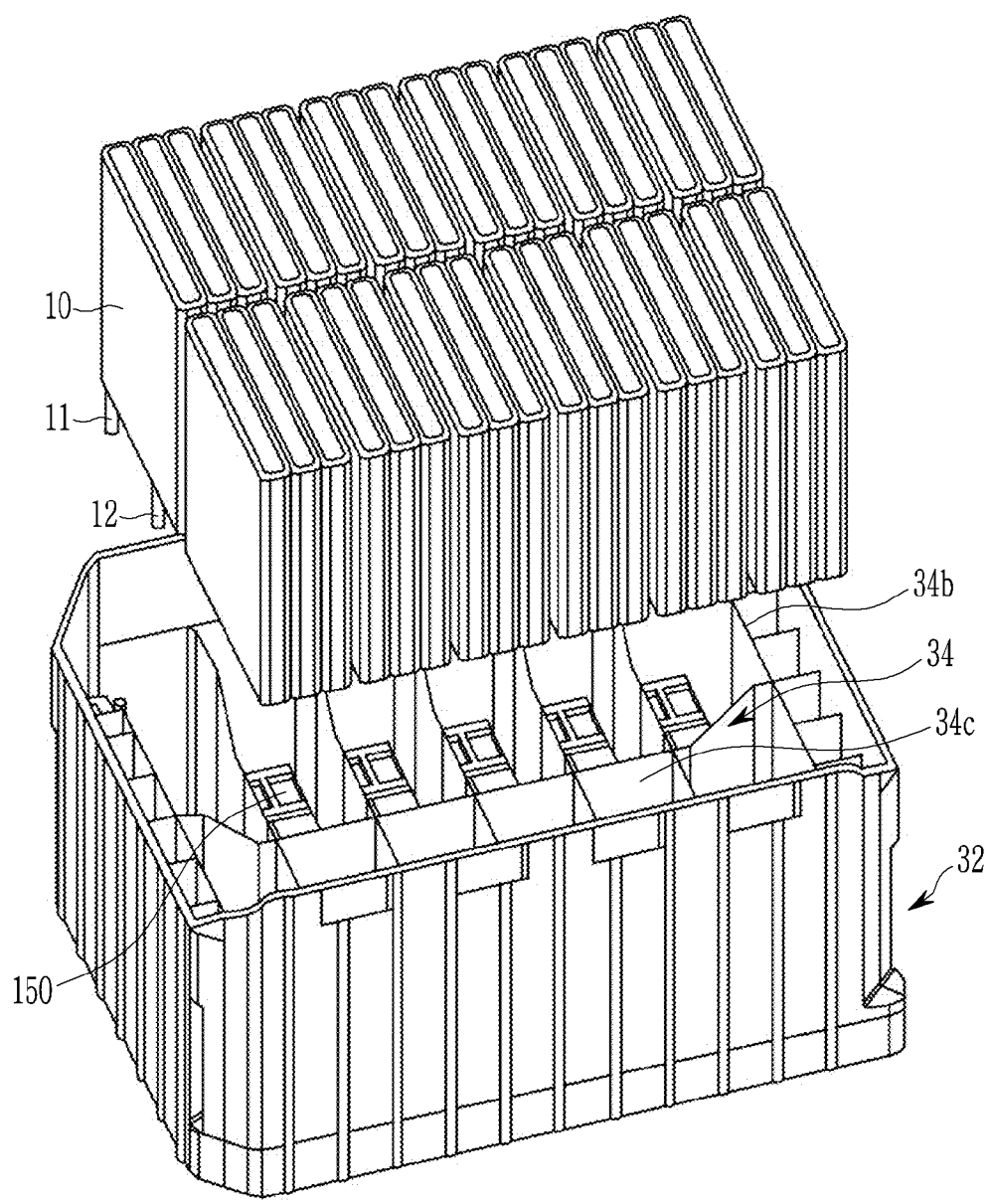

[Fig. 6]
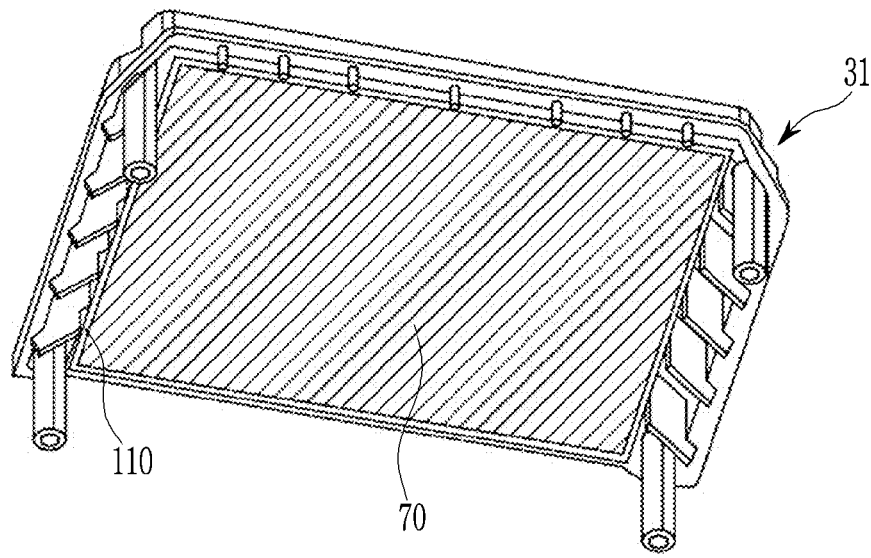
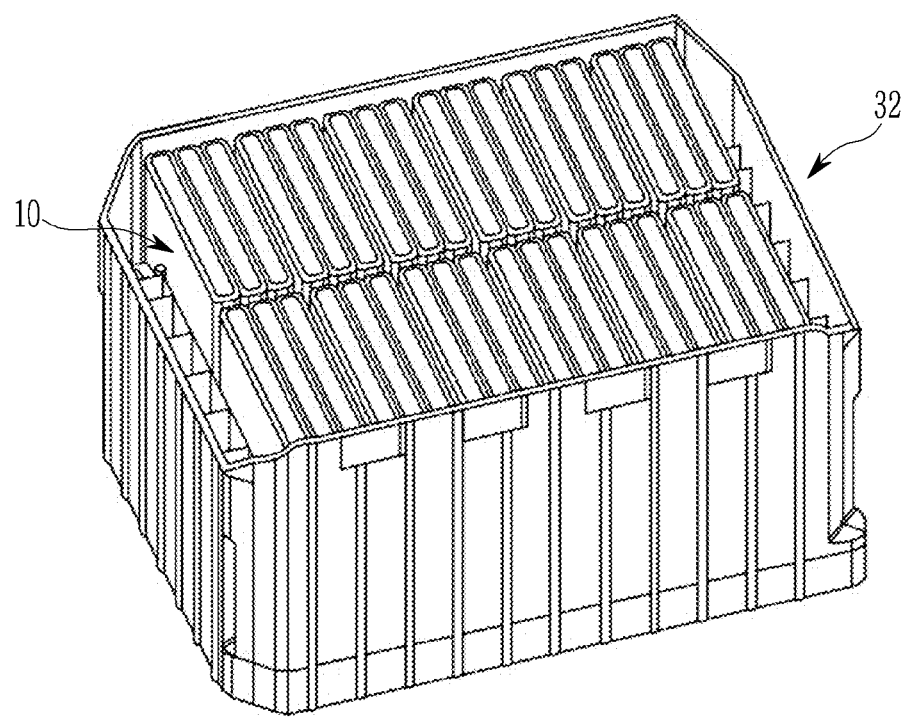

[Fig. 7]
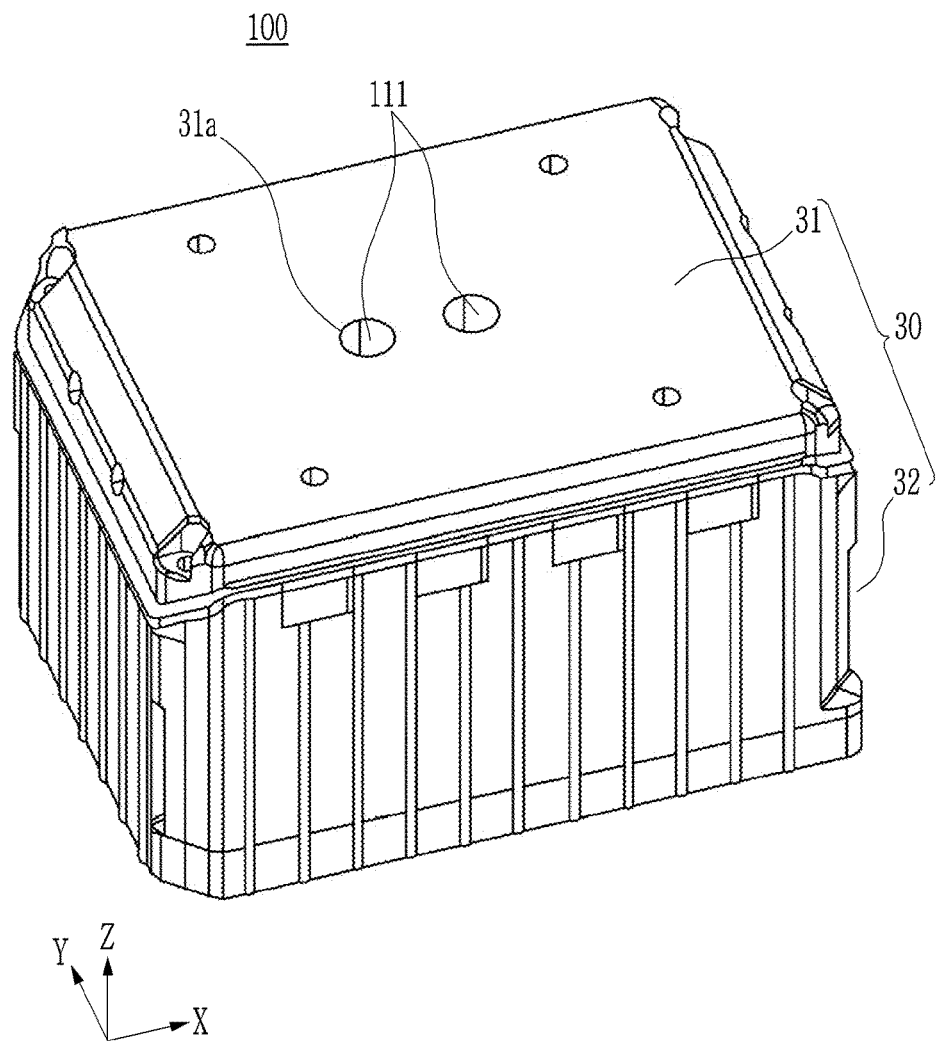
[Fig. 8a]
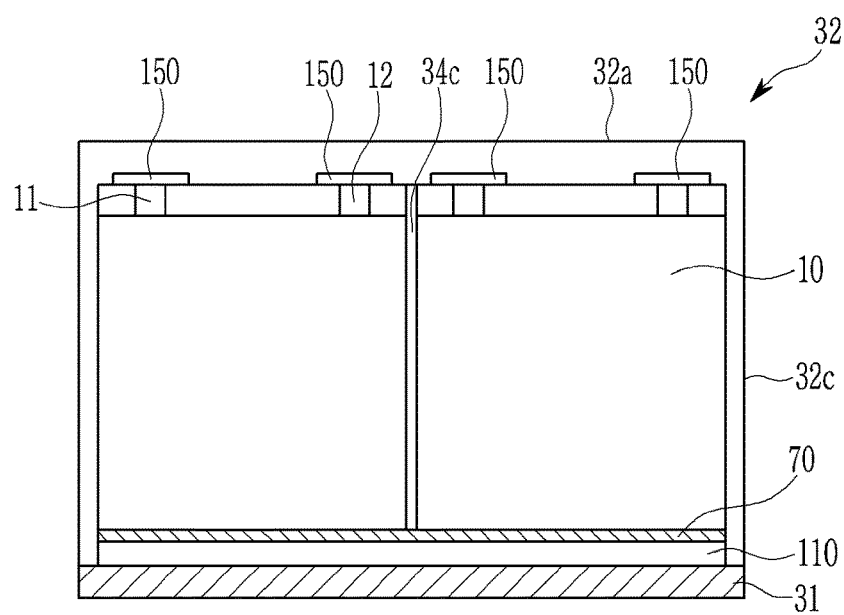

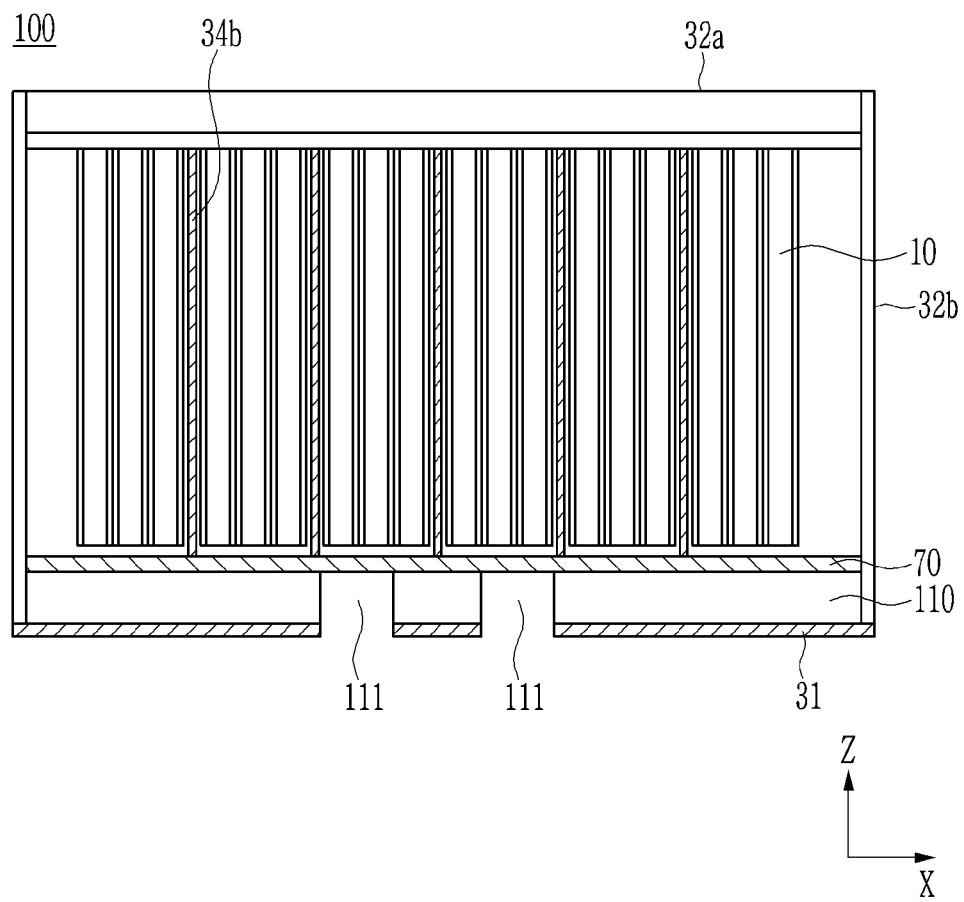
[Fig. 8b]

BATTERY MODULE INCLUDING A HOUSING WITH INTEGRATED BUS BAR

TECHNICAL FIELD

The present invention relates to a battery module a housing with integrated bus bar and a method for manufacturing the same.

BACKGROUND ART

Rechargeable batteries are widely used in many technology field, e.g. low-capacity rechargeable batteries are used as power supply for small electronic devices, such as cellular phones, notebook computers and camcorders, while high-capacity rechargeable batteries are used as the power supply for hybrid vehicles and the like.

Rechargeable batteries or secondary batteries differs from primary batteries in that they can be repeatedly charged and discharged, while the latter provide only an irreversible conversion of chemical to electrical energy.

A unit battery cell includes an electrode assembly comprising a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. Furthermore, the battery cell comprises positive and negative terminals electrically connected to the positive and negative electrodes, respectively, and extending outside the case.

In general, a battery module is formed of a plurality of unit battery cells coupled in series and/or in parallel so as to provide the required energy density, e.g. a high-power rechargeable battery for an electric vehicle. In order to connect the battery cells in series or in parallel, the electrode terminals of adjacent battery cells are connected by so-called "bus bars". Bus bars are usually metal plates electrically connected to the electrode terminals of two or more battery cells and are manually fixed thereto by means of screws or the like. Therefore, the application of the bus bars between the battery cells may result long and laborious.

Alternatively, a holding frame for the bas bars, a so-called cell connection unit (CCU), may be used. A CCU is made of an electric insulating material, such as plastic, and the bus bars are pre-assembled in the CCU. The bus bars can be then mounted on the respective electrode terminals in a single step. Since the CCU holds the bus bars in their position before they are mounted on the terminals, the application of the cell connection unit is simplified as compared to the application of single bus bars.

However, since the single bus bars have to be manually pre-assembled on the cell connection unit, the overall manufacturing process is still rather difficult and time-consuming. Furthermore, because the bus bars are fixed to the CCU, previous to the mounting on the battery cells, it is not possible to compensate for accidental fluctuations in the cell height. Thus, the tolerance in the position and height of the battery cells is very low when using a CCU. Additionally, the use of a plastic frame increases the overall volume inside the battery module.

DISCLOSURE OF INVENTION

Technical Problem

It is an object of the present invention to overcome or reduce at least some of the drawbacks of the prior art and to provide a battery module with a simplified assembly procedure and which may compensate for small variations in the height of the battery cells.

Solution to Problem

One or more of the drawbacks of the prior art could be avoided or reduced by the battery module of the present invention, which comprises a housing with integrated bus bars, and by the method of manufacturing the battery according to the present invention.

In particular, according to an aspect of the present invention a battery module is provided which comprises a plurality of secondary battery cells, each battery cell comprising a first terminal and a second terminal spaced apart and electrically isolated from one another, the first and second terminals having opposite polarities, a housing comprising an upper housing part and a lower housing part assembled together to completely surround the plurality of battery cells, and a plurality of bus bars integrated in the upper housing part, wherein each of the plurality of bus bars is connected to one of the first and second terminals of at least two battery cells.

For instance, a bus bar may be connected to the first terminal of a first battery cell and to the second terminal of a second battery cell adjacent to the first battery cell.

The upper housing part preferably covers all sides of the battery module except one side and the lower housing part covers the open side of the upper housing part. Preferably, the upper housing part covers a top side and the four lateral sides of the battery module, while the lower housing part covers a bottom side of the battery module.

Preferably, the upper housing part has the shape of a rectangular hexahedron (or rectangular box) comprising a top portion covering the top side of the battery module and four side portions extending from the four edges of the top portion and covering the four lateral sides of the battery module.

The top portion may comprise openings for at least partially exposing the bus bars. The exposed portions of the bus bars may correspond to the positions where the first and second terminals contact the bus bars. The bus bars may be made of conductive material. Preferably, the bus bars may be made of aluminum.

Preferably, the upper housing part further comprises partition walls for separating the battery cells inside the battery module.

Preferably, the battery module further comprises a heat exchange member provided between the plurality of battery cells and the lower housing part for cooling down the battery cells. The heat exchange member may include a cooling plate with a passage. Preferably, the cooling plate is made of aluminum. The cooling plate may be connected to the lower housing part by means of clips. Preferably, a thermally conductive layer is further provided between the plurality of battery cells and the heat exchange member for ensuring a thermal contact between the plurality of battery cells and the heat exchange member.

Preferably, the bus bars are welded to the corresponding first and second terminals of the battery cells.

According to another aspect of the present invention, a vehicle including a battery module as defined above is provided.

According to a further aspect of the present invention, a method of manufacturing a battery module includes: providing an upper housing part with integrated bus bars, the upper housing part having the shape of a rectangular hexahedron with a side open, inserting a plurality of battery cells into the upper housing part through the open side so that the first and second terminals of the battery cells extend downwards to contact the bus bars, assembling a lower housing part on the upper housing part to form a housing enclosing the battery cells.

Preferably, the upper housing part comprises a top portion and four side portions extending from the four edges of the top portion. Preferably, the bus bars are integrated in the top portion of the upper housing part.

Preferably, the upper housing part is formed by injection molding a plastic material. The plastic material may be PP GF30 or PA GF30. Preferably, the plurality of bus bars is formed as a leadframe integrated in the top portion of the upper housing part. Preferably, the upper housing part is formed by over-molding the bus bars. The top portion of the upper housing part may comprise openings exposing at least a part of the bus bars.

Preferably, the bus bars may be attached to respective first and second terminals of the battery cells by welding. Preferably, the welding is automatically performed from outside the housing through the openings in the top portion of the upper housing part.

Preferably, before assembling the lower housing part to the upper housing part, a heat exchange member is provided on a first surface of the lower housing part for cooling the battery cells and the lower housing part is assembled on the upper housing part so that the heat exchange member faces the battery cells.

Preferably, a thermally conductive layer is provided on the heat exchange member after inserting the battery cells into the upper housing part and before assembling the lower housing part to the upper housing part. The thermally conductive layer may be made of thermal conductive glue or elastic thermal interface material (TIM), i.e. thermally conductive layer may be made of thermally conductive one or two component adhesives or pads such as polyurethane, epoxy resin or silicone, containing thermal conductive substances (e.g. aluminium hydroxide or aluminium oxide).

Advantageous Effects of Invention

Accordingly to exemplary embodiments, a battery module with a simplified assembly procedure and which may compensate for small variations in the height of the battery cells may be provided.

BRIEF DESCRIPTION OF DRAWINGS

Features will become apparent to those of ordinary skill in the art by describing in detail exemplary embodiments with reference to the attached drawings in which:

FIG. 1 illustrates a schematic perspective view of a conventional battery module;

FIG. 2 illustrates a schematic cross section of an exemplary battery cell;

FIG. 3 illustrates a schematic perspective view of an exemplary embodiment of a bus bar according to the present invention;

FIG. 4 illustrates a schematic perspective view of an exemplary embodiment of a housing with integrated bus bar according to the present invention;

FIGS. 5 to 7 illustrate assembling steps of a battery module according to an embodiment of the present invention; and FIGS. 8a and 8b illustrate sectional views of a battery module according to the present invention.

BEST MODE FOR CARRYING OUT THE INVENTION

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted.

It will be understood that when a film, a region, or an element is referred to as being "above" or "on" another film, region, or element, it can be directly on the other film, region, or element, or intervening films, regions, or elements may also be present.

Herein, the terms "upper" and "lower" are defined according to the z-axis. For example, the upper housing is positioned at the upper part of the z-axis, whereas the lower housing is positioned at the lower part thereof. In the drawings, the sizes of elements may be exaggerated for clarity. For example, in the drawings, the size or thickness of each element may be arbitrarily shown for illustrative purposes, and thus the embodiments of the present invention should not be construed as being limited thereto.

Unless otherwise noted, like reference numerals denote like elements throughout the attached drawings and the written description, and thus, descriptions thereof will not be repeated.

Referring to FIG. 1, a conventional battery module 100 is shown, which includes a plurality of battery cells 10 aligned in one direction (X direction). FIG. 2 shows a cross-sectional view of an exemplary battery cell 10 in FIG. 1 taken along the YZ-plane.

As depicted in FIG. 2, a battery cell 10 includes an electrode assembly 80 and a case 26 for accommodating the electrode assembly 80. The battery cell 10 may also include a cap assembly 14 for sealing an opening of the case 26. The battery cell 10 will be described as a non-limiting example of a lithium ion secondary battery configured to have a prismatic shape, i.e. a rectangular hexahedron shape. However, the shape of the case may be varied according to the intended purpose and design of the device, e.g. the cell may also have a cylindrical shape.

The electrode assembly 80 may be formed as a jelly roll type electrode assembly by spirally winding a positive electrode 81 and a negative electrode 82 with a separator 83 therebetween. The positive electrode 81 and the negative electrode 82 may respectively include coated regions of current collectors formed of a thin metal foil, on which an active material may be coated, and may respectively include positive and negative electrode uncoated regions 81a and 82a of the current collectors on which no active material is coated. As a non-limiting example, the coated region of the positive electrode 81 may be formed by coating a base material formed of a metal foil, such as an aluminum foil, with an active material, such as transition metal oxide or the like. Also, the coated region of the negative electrode 82 may be formed by coating a base material formed of a metal foil, such as a copper or nickel foil, with an active material, such as carbon, graphite, or the like.

The positive electrode uncoated region 81a and the negative electrode uncoated region 82a may be on sides that are opposite to each other with respect to the coated regions. The electrode assembly 80 may be accommodated in the case 26 together with an electrolyte solution. The electrolyte solution may be made of a lithium salt, such as LiPF6 or LiBF4 with an organic solvent, such as EC, PC, DEC, EMC, or EMC. The electrolyte solution may be in a liquid, solid, or gel state. The case 26 may be configured to have a substantially cuboidal shape, and an opening may be formed at one side thereof. The case 26 may be formed of a metal, such as aluminum.

The cap assembly 14 is provided with positive and negative electrode terminals 11 and 12 (first and second terminals, respectively) having different polarities, and a vent 13. The positive terminal 11 and the negative terminal 12 are electrically connected to the positive electrode 81 and the negative electrode 82, respectively. The vent 13 is a safety means of the battery cell 10, which acts as a passage through which gas generated in the battery cell 10 is exhausted to the outside of the battery cell 10. Usually, the battery cells 10 are all arranged to have the electrode terminals 11 and 12 extending in the same direction. In the present case, the electrode terminals 11 and 12 extend upwards.

The battery module 100 includes a housing 30 enclosing the battery cells 10 for protecting the battery cells 10. The housing 30 comprises an upper housing part 32 formed in the shape of a rectangular hexahedron with an open side at the bottom and a lower housing part 31 located at a bottom side of the battery module 100 and adapted to be assembled to the upper housing part 32 to form the housing 30.

Generally, the battery cells 10 generate a large amount of heat while being charged/discharged. The generated heat is accumulated in the battery cells 10, thereby accelerating the deterioration of the battery cells 10. Therefore, the battery module 100 further includes a heat exchange member 110, which is provided adjacent to the bottom surface of the battery cells 10 so as to cool down the battery cells 10.

The heat exchange member 110 may include a cooling plate provided to have a size corresponding to that of the bottom surface of the plurality of battery cells 10, e.g., the cooling plate may completely overlap the entire bottom surfaces of all the battery cells 10 in the battery module 100. The cooling plate usually includes a passage through which a coolant can flow. The coolant performs a heat exchange with the battery cells 10 while circulating inside the heat exchange member 110, i.e., inside the cooling plate. In addition, an elastic member 120 made of rubber or other elastic materials may be interposed between the lower housing part 31 and the heat exchange member 110.

The battery cells 10 are connected in series and/or in parallel by means of conventional bus bars 15, which are metal plates connecting the positive and negative electrode terminals 11 and 12 of neighboring battery cells 10. Thus, the battery module 100 may be used as power source unit by electrically connecting the plurality of battery cells 10 as one bundle.

Conventional bus bars 15 like the ones depicted in FIG. 1 are usually fixed to the electrode terminals with nuts 16 and screws or by welding, i.e. they have to be manually mounted on the battery module 100. Therefore, the application of the bus bars 15 between the battery cells may result long and laborious.

According to the present invention an improved bus bar is employed, which is integrated in the housing 30 of the battery module 100.

FIG. 3 shows a schematic perspective view of an exemplary embodiment of a bus bar 150 according to the present invention and FIG. 4 shows a schematic perspective view of an exemplary embodiment of a housing with integrated bus bar 150 according to the present invention.

According to an embodiment of the present invention the bus bars 150 are formed as a lead frame to be integrated in the upper housing part 32 of the battery module 100. In the specific embodiment illustrated in FIG. 3 a 12s3p configuration is shown, i.e. a configuration wherein twelve groups of battery cells 10 are connected in series, each group comprising three battery cells connected in parallel. However, the invention is not limited thereto and other configurations as well as different amount of battery cells are possible.

The bus bars 150 are integrated in a top portion 32a of the upper housing part 32, i.e. the bus bars 150 are integrated in a portion of the upper housing part 32, which is covering the upper side of the battery module 100.

FIG. 4 shows a schematic perspective view of an upper housing part 32 with integrated bus bar 150. The upper housing part 32 has the form of a rectangular hexahedron, i.e. of a rectangular box, comprising a top portion 32a and four side portions 32b, 32c extending from the top portion 32a. The bottom side of the upper housing part 32, which is opposite to the top portion 32a, is open. The bus bars 150 consist of metallic plates embedded in the top portion 32a of the upper housing part 32. The bus bars 150 are made of conductive material, for instance, the bus bars 150 may be made of aluminum. The battery housing 30 is formed by injection molding. The bus bars 150 are inlaid in a lower tooling side and when the injection-mold-tool is closed with an upper tooling side, the bus bars 150 are clamped between lower and upper tooling-side. Then the plastic material is injected. After removal of the part from the tooling, the clamping surface on the bus bars 150 builds the connecting and welding-area to the terminals of the battery-cells.

The battery housing 30 is made of insulating material, such as reinforced plastic. For instance, the battery housing 30 may be made of PP GF30, PA GF30, or the like. The battery housing 30 includes a plurality of openings 33 in the top portion 32a exposing the bus bars 150 for welding.

In the following, a manufacturing method of a battery module according to the present invention will be illustrated referring to FIGS. 5, 6 and 7.

FIG. 5 shows the assembly of the battery cells 10 into the housing 30. In a first step, the upper housing part 32 is turned upside-down, so that the top portion 32a including the bus bars 150 is located at the bottom. Then, the plurality of battery cells 10 are inserted in the upper housing part 32 with the first and second terminals 11 and 12 extending downwards toward the top portion 32a of the upper housing part 32, so that the first and second terminals 11, 12 of the battery cells 10 are in contact with the exposed parts of the corresponding bus bars 150. The bus bars 150 are fixed to the corresponding first and second terminals 11, 12 by welding.

Since the battery cells 10 are inserted into the housing 30 with the electrode terminals 11, 12 extending downwards, a contact between the electrode terminals 11, 12 and the corresponding of the bus bars 150 is achieved for all battery cells 10 because of the gravity force acting on the battery cells 10 or of an individual force on the bottom side of each battery cell 10, irrespective of the height of the individual battery cell 150. Therefore, the welding can be automatically performed, i.e. by means of a machine or robot, for all battery cells 10 through the openings 33 in the top portion 32a of the housing 30.

Hence, according to the present invention, the assembly of the bus bars 150 to the electrode terminals 11, 12 can be simplified because the bus bars 150 are integrated in the top portion 32a of the housing 30, so that the bus bars 150 are held in the required position by the housing and the contact between the electrode terminals of the battery cells 10 and the corresponding bus bar occurs automatically when inserting the battery cells into the housing.

Since the assembly of the battery cells is performed upside-down, a contact between the electrode terminals and the bus bars can be easily achieved, even when the battery cells have different heights. Thus, a tolerance to height fluctuations of the battery cells is enhanced.

Furthermore, sine no additional CCU is required for pre-assembling the bus bars and holding the bus bars in their positions, an overall size of the battery module can be reduced.

FIG. 6 shows a perspective view of the upper housing part 32, wherein the battery cells 10 have been inserted, and the lower housing part 31 before assembling the lower hosing part 31 onto the upper housing part 32. Since the battery cells 10 are upside-down, a difference in cell height between the battery cells 10 in the upper housing part may occur at the side of the battery cells 10 opposite to the top portion 32a of the upper housing part 32. In order to compensate for said difference, a thermally conductive layer 70 is deposited on the heat exchange member 110 located on the lower housing part 31 to ensure thermal connection between the cell case 26 of the battery cells 10 and the heat exchange member 110. The thermally conductive layer 70 may be made of thermally conductive glue or elastic thermal interface material, such as thermally conductive one or two component adhesives or pads such as polyurethane, epoxy resin or silicone, containing thermal conductive substances (e.g. aluminium hydroxide or aluminium oxide).

The heat exchange member 110 is located on the lower housing part 31. The heat exchange member 110 may comprise an aluminum cooler connected to lower housing part 31 by means of clips or the like.

Finally, the lower housing part 31 with the heat exchange member 110 is assembled to the upper housing part 32 to seal the battery.

FIG. 7 shows a bottom perspective view of the assembled battery module 100. The lower housing part 31 comprises cooling openings 31a corresponding to coolant feed interfaces 111 of the heat exchange member 110 through which the coolant is input into or discharged from the heat exchange member 110.

FIGS. 8a and 8b show sectional views of the battery module 100 in the upright position. According to the illustrated embodiment the battery cells 10 are assembled in the housing 30 in two rows including 18 battery cells each, wherein the battery cells 10 are divided into 12 groups, each group including 3 battery cells connected in parallel. The housing 30 also includes partition walls 34 separating a group of battery cells 10 from the other groups. In the present case, one longitudinal partition wall 34c parallel to the long side portion 32c of the upper housing part 32 and six short partition walls 34b parallel to the short side 32b of the upper housing part 32. However, the present invention is not limited thereto and a different number of battery cells or different configurations are possible.

Although the invention has been explained in relation to its preferred embodiments as described above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A battery module, comprising:
   a plurality of battery cells, each of the plurality of battery cells including a bottom side and a top side opposite to each other, the top side having a first terminal and a second terminal spaced apart and electrically isolated from one another;
   a housing including an upper housing part and a lower housing part assembled together to enclose the plurality of battery cells, the bottom side of each of the plurality of battery cells facing the lower housing part, and the top side of each of the plurality of battery cells facing the upper housing part; and
   a plurality of bus bars embedded inside the upper housing part and electrically connecting adjacent ones of the plurality of battery cells, a top portion of the upper housing part being a single and integral structure that continuously and integrally surrounds and covers an entirety of each of the plurality of bus bars,
   wherein each of the plurality of bus bars is connected to one of the first and second terminals of at least two of the plurality of battery cells,
   wherein the top portion includes penetrating openings at least partially exposing the plurality of bus bars, and
   wherein the first terminal and the second terminal of each of the plurality of battery cells are contacted with bus bars exposed by the penetrating openings and are welded to each other.

2. The battery module of claim 1, wherein:
   the upper housing part has a shape of a rectangular hexahedron including four side portions extending from four edges of the top portion, and
   the top side of each of the plurality of battery cells faces the top portion of the upper housing part, the plurality of bus bars being embedded inside the top portion.

3. The battery module of claim 2, wherein the upper housing part further includes partition walls separating the plurality of battery cells inside the battery module.

4. The battery module of claim 1, further comprising:
   a heat exchange member between the plurality of battery cells and the lower housing part, the heat exchange member to cool down the plurality of battery cells; and
   a thermally conductive layer between the plurality of battery cells and the heat exchange member, the thermally conductive layer to ensure a thermal contact between the plurality of battery cells and the heat exchange member.

5. The battery module of claim 1, wherein the plurality of bus bars are metallic plates embedded in the upper housing part, the upper housing part covering surfaces of the plurality of bus bars that face away from the plurality of battery cells.

6. A vehicle including a battery module according to claim 1.

7. A method of manufacturing a battery module, the method comprising:
   providing an upper housing part with embedded bus bars therein, the upper housing part having a shape of a rectangular hexahedron with an open side, a top portion of the upper housing part being a single and integral structure that continuously and integrally surrounds and covers an entirety of each of the plurality of bus bars, and the top portion including penetrating openings at least partially exposing the plurality of bus bars;
   inserting a plurality of battery cells into the upper housing part through the open side so that first and second terminals of each of the plurality of battery cells extend downwards to contact the bus bars, each of the plurality of battery cells including a bottom side and a top side opposite to each other, the top side having a first terminal and a second terminal spaced apart and electrically isolated from one another, and each of the bus bars exposed by the penetrating openings being connected to one of the first and second terminals of at least two of the battery cells to electrically connect adjacent ones of the plurality of battery cells; and assembling a lower housing part on the upper housing part to form a housing enclosing the plurality of battery cells, such that the bottom side of each of the plurality of battery cells faces the lower housing part, and the top side of each of the plurality of battery cells faces the upper housing part.

8. The method of claim 7, wherein:
the upper housing part includes four side portions extending from four edges of the top portion, and
the bus bars are embedded in the top portion.

9. The method of claim 7, wherein the upper housing part is formed by injection molding a plastic material, and wherein the bus bars are metallic plates embedded in the upper housing part.

10. The method of claim 7, wherein the bus bars are welded to corresponding first and second terminals of the plurality of battery cells through the openings.

11. The method of claim 7, further comprising:
providing a heat exchange member for cooling the plurality of battery cells on a first surface of the lower housing part before assembling the lower housing part to the upper housing part; and
assembling the lower housing part on the upper housing part so that the heat exchange member faces the plurality of battery cells.

12. The method of claim 11, further comprising:
providing a thermally conductive layer on the heat exchange member after inserting the plurality of battery cells into the upper housing part and before assembling the lower housing part to the upper housing part.

13. The battery module of claim 1, wherein each of the plurality of bus bars includes a first surface and a second surface opposite each other, the first surface facing and directly contacting the upper housing part, and the second surface facing and directly contacting one of the first and second terminals.

14. The battery module of claim 2, wherein the top portion of the upper housing part covers at least first surfaces of the plurality of bus bars that face away from the plurality of battery cells, each of the plurality of bus bars being between one of the first and second terminals and a surface of the top portion that faces the plurality of battery cells.

15. The battery module of claim 14, wherein:
the top portion of the upper housing part further covers side surfaces of the plurality of bus bars, the side surfaces extending directly from the first surfaces, and
the surface of the top portion of the upper housing part that faces the plurality of battery cells is coplanar with surfaces of the plurality of bus bars that face the plurality of battery cells.

16. The battery module of claim 1, wherein an entire bottom surface of each of the plurality of bus bars that faces the plurality of battery cells is flat, the entire bottom surface of each of the plurality of bus bars being coplanar with a surface of the top portion of the upper housing part facing the plurality of bus bars.

* * * * *